March 13, 1956     D. A. ROBINETTE     2,738,150
SINGLE AILERON CONTROL SYSTEM FOR AIRPLANES
Filed Dec. 15, 1952     2 Sheets-Sheet 1
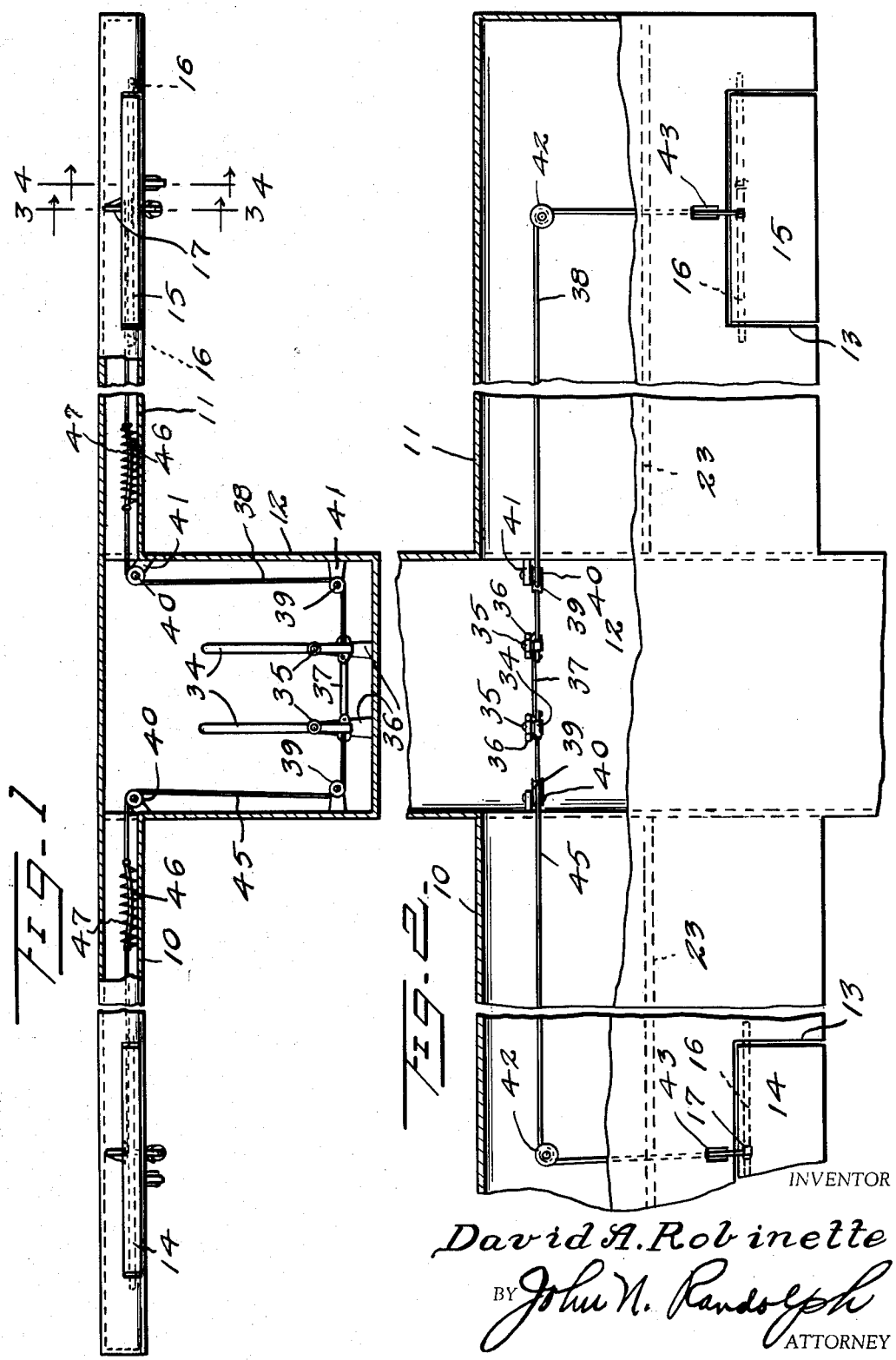
INVENTOR
David A. Robinette
BY John N. Randolph
ATTORNEY

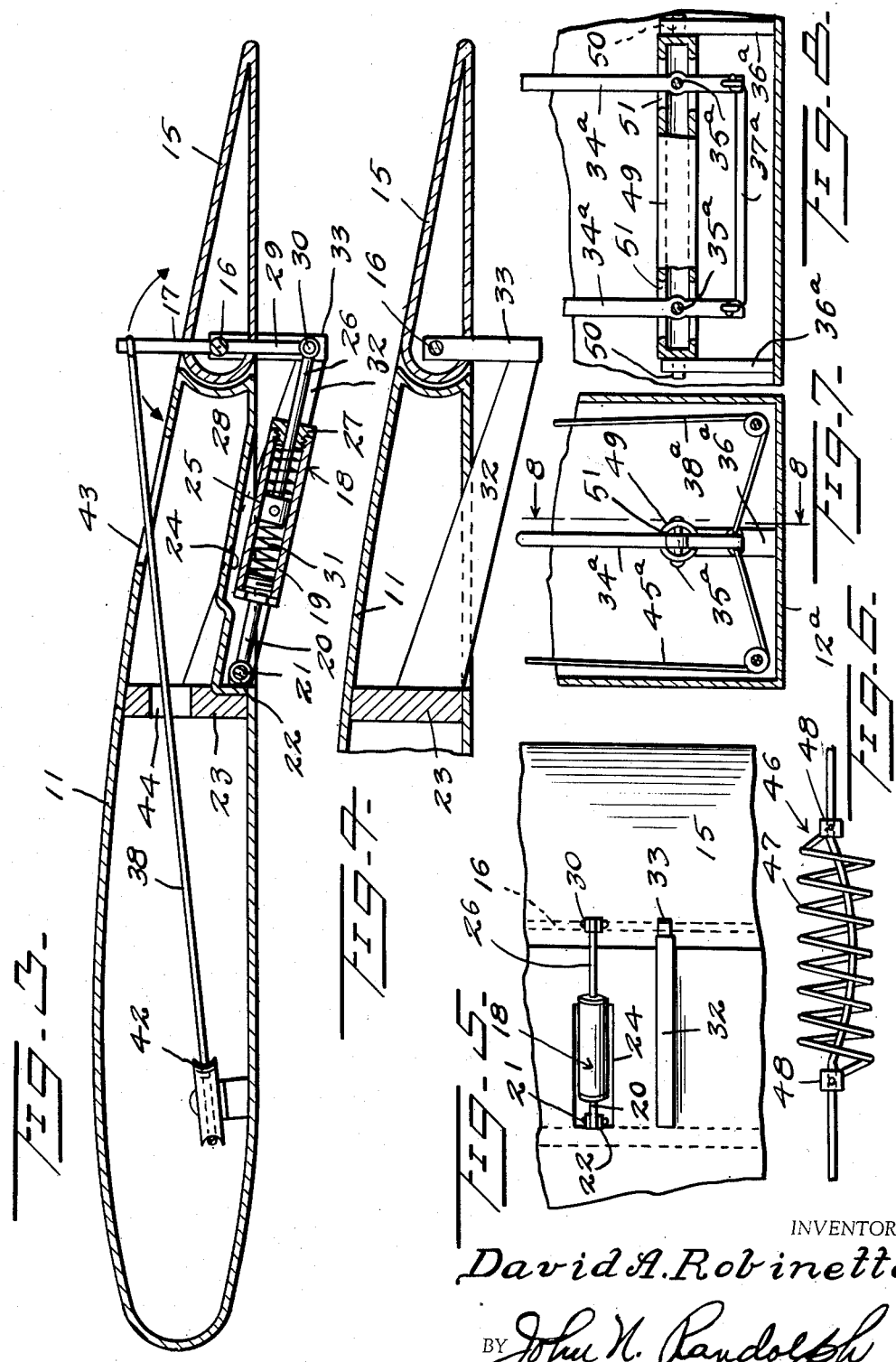

United States Patent Office 2,738,150
Patented Mar. 13, 1956

2,738,150

SINGLE AILERON CONTROL SYSTEM FOR AIRPLANES

David A. Robinette, Springfield, Mo.

Application December 15, 1952, Serial No. 325,939

1 Claim. (Cl. 244—90)

This invention relates to an aileron control system primarily adapted to simplify flying and to eliminate to a large extent the required coordination between the operation of the ailerons and rudder and more especially to substantially eliminate the use of a rudder by the operation of a single aileron only in controlling the turning of an airplane.

More particularly, it is an aim of the present invention to provide an aileron control system wherein only the aileron on the side of the airplane toward which the turn is being made is actuated whereby said aileron is elevated forcing the wing down toward which the turn is to be made and additionally causing a slight drag only on the side of the airplane toward which the turn is made, so that the amount of turn can be established, and thereafter maintained by elevator control, as in present methods of controlling.

A further object of the invention is to provide a single aileron control system whereby use of the rudder is rendered unnecessary as a rudder is not required to overcome aileron drag established by the aileron on the opposite side of the airplane or located on the outer side of the turn since such aileron remains in a normal position to eliminate the creation of a drag thereby which would resist the turning of the aircraft.

Various other objects and advantages of the invention will hereinafter become more fully apparent from the following description of the drawings, illustrating a presently preferred embodiment of the invention applied to various types of central controlling agents, and wherein:

Figure 1 is a cross sectional view through a portion of an airplane showing a preferred form of the single aileron control system employed with control sticks arranged side by side;

Figure 2 is a fragmentary top plan view partly in horizontal section thereof;

Figure 3 is an enlarged cross sectional view taken substantially along a plane as indicated by the line 3—3 of Figure 1;

Figure 4 is a fragmentary cross sectional view through the trailing portion of the wing taken substantially along a plane as indicated by the line 4—4 of Figure 1;

Figure 5 is a fragmentary bottom plan view of a portion of the wing and aileron;

Figure 6 is an enlarged detailed side elevational view of one of the slack take-up units;

Figure 7 is a fragmentary cross sectional view of the lower portion of the airplane cockpit showing the use of tandem sticks as the central controlling agent, and Figure 8 is a longitudinal sectional view thereof, partly in side elevation, taken substantially along a plane as indicated by the line 8—8 of Figure 7.

Referring more specifically to the drawings, Figures 1 and 2 illustrate a portion of a conventional type of aircraft including opposed wings 10 and 11 and a cockpit portion 12 which is disposed between the left wing 10 and right wing 11. The wings 10 and 11 are provided in portions of their trailing edges with recesses 13 to accommodate left and right ailerons 14 and 15, respectively, which are pivotally mounted therein about pivot rods or shafts 16 which are located adjacent the forward edges of the ailerons and which extend from the ends thereof and are journalled in portions of the wings disposed immediately beyond the ends of the recesses 13, as is conventional. As best seen in Figure 3, each aileron 14 and 15 has a horn 17 fixed to the shaft 16 thereof, or secured to the aileron adjacent said shaft, and which horns extend upwardly from the upper surfaces of the ailerons.

Each aileron is provided with a yieldable aileron return unit, designated generally 18 which, as illustrated in Figure 3, may comprise a cylinder 19 having a rod 20 extending from one end thereof and pivotally connected at 21 to a bracket member 22 which may be conveniently anchored to a rear spar 23 of the wing. The unit 18 preferably being partially disposed in a recess 24 in the underside of the wing. A plunger or head 25 is slidably disposed in the cylinder 19 and has a rod 26 extending therefrom and slidably through a removable spring stop 27 which is disposed removably in the opposite end of the cylinder 19. An expansion coil spring 28 is disposed in the cylinder 19 between the plunger 25 and stop 27 for urging the plunger away from the stop 27 and the rod 26 inwardly of said cylinder. An arm or lever 29 is fixedly secured to the aileron, approximately in line with its pivot 16, and is preferably secured to said pivot shaft 16 and extends downwardly therefrom and from the underside of the aileron. The outer end of the rod 26 is pivotally connected at 30 to the lower end of the arm 29. A lighter cushioning spring 31 may be disposed in the cylinder 19 between its first mentioned end and the plunger 25 for cushion movement of the plunger under the biasing action of the spring 28.

A stationary abutment member 32, as best seen in Figure 4, is secured to the wing spar 23 and extends downwardly and rearwardly therefrom through the underside of wing and terminates below the forward end of the aileron. A stop 33 is preferably fixed to the shaft 16 and aileron and extends downwardly from the underside of said aileron and is disposed to abut against the rear end of the abutment 32 when the aileron is in a position substantially coplanar to the wing, as illustrated in Figures 3 and 4. Thus, the resilient holding unit 18 cooperates with the abutment and stop means 32, 33 to normally maintain the aileron in its position of Figures 3 and 4 and said abutment and stop means positively prevents the aileron from swinging downwardly below a position normal to the wing. Obviously, other forms of yieldable aileron holding means and other forms of abutment and stop means may be employed.

Figures 1 and 2 illustrate one conventional form of central controlling agent comprising side by side control sticks 34 located in the cockpit 12 and pivotally supported near to but spaced from their lower ends at 35 on a pair of posts 36 which rise from the bottom of the cockpit 12. The lower ends of the sticks 34 are connected to swing in unison by a link 37. A cable 38 has one end pivotally connected to the outer side of the lower end of the right hand control stick 34 and extends laterally to the right therefrom around the underside of a lower pulley 39 and thence over the upper side of an upper pulley 40. The pulleys 39 and 40 are mounted on the inner side of the right hand side wall of the cockpit 12 by pulley brackets 41 which are secured to said cockpit wall. The pulley 40 is located above the level of the underside of the wing and the cable 38 extends therefrom to the right through the right wing 11 and around a pulley 42 which is disposed horizontally in the wing 11. The cable 38 extends rearwardly from the pulley 42 outwardly through a slot 43 in the upper side of the wing 11, after passing through an opening 44 of the spar 23, and is attached at its opposite end to the upper end of the horn 17. The other side of the cockpit 12 is provided with similar vertical pulleys 39 and 40 around which a cable 45 is trained and which is secured at its inner end to the outer side of the lower end of the lefthand stick 34. The cable 45 extends to the left through the wing 10 and around the horizontal pulley 42 thereof and is similarly connected to the horn 17 of the left aileron 14 after passing through the left wing spar 23 and the opening 43 in the upper side of the left wing.

Each cable 38 and 45 is provided with a cable tensioning unit 46, which tensioning units are preferably mounted in the cable portions disposed between the pulleys 40 and 42. The cable tensioning units 46 may each comprise a single contractile or pull spring 47, as best illustrated in Figure 6, which loosely surrounds a portion of the cable and which is provided at each end thereof with a clamping sleeve 48, which clamping sleeves are secured to spaced portions of the cables. When the two ailerons are in positions substantially coplanar to the wings, such as the position of the aileron 15 as shown in Figures 3 and 4, and the control sticks 34 are in normal upright positions, the cables 38 and 45 are substantially taut from end-to-end thereof and the tensioning units 46 are stretched or tensioned.

Assuming that the aircraft equipped with the control system as previously described is to be turned to the right, this is accomplished by swinging the upper end of either stick 34 to the right as seen in Figure 1, both sticks being moved in the same direction in unison. The righthand control stick 34 will thus exert a pull on the righthand cable 38 causing the end of the cable which is attached to the horn 17 to be pulled forwardly to thereby swing the right-hand aileron 15 upwardly about its pivot 16 so that the trailing edge of the aileron 15 will be raised. This will cause the right wing 11 to be forced downwardly and in addition the raised right aileron 15 will cause a slight drag at the right side of the airplane causing the airplane to turn to the right. After the desired amount of turn has been thus established, it may be maintained by elevator control by conventional methods, not shown. As this operation is accomplished, the inner end of the left cable 45 is slacked off. However, the cable tensioning unit 46 of the left cable 45 will contract so that all of the slack in the cable 45 will be taken up between the clamping collars or sleeves 48, as illustrated in Figure 6, to thus maintain the cable 45 otherwise taut to prevent such cable from becoming disengaged from the pulleys 39, 40 and 42 over which it is trained. It will be noted that the left-hand aileron 14 remains in a position substantially coplanar to the wing 10 under the biasing action of the spring 28 during the right-hand turn and the trailing edge thereof is not swung downwardly as in conventional aileron control systems. Accordingly, no rudder operation is required in accomplishing the right turn since the rudder is ordinarily utilized in conventional aileron control systems for overcoming the drag of the left-hand wing 10 created by the downward swinging movement of the trailing end of the left aileron 14 when the right aileron 15 is elevated to accomplish a right turn. Since this drag is eliminated, no rudder operation or action is required and the drag produced by the elevated right aileron and the lowered right wing will effectively accomplish the right-hand turn thus making rudder use unnecessary and eliminating the normal coordination required between ailerons and rudder, thus greatly simplifying airplane flight control. The same operation in reverse is accomplished by swinging the upper ends of the sticks 34 to the left for raising the left aileron 14, while the right aileron 15 remains in a position substantially coplanar to the wing 11, for forcing the left wing down and to create the necessary drag at the left of the plane for accomplishing a left turn. It will also be apparent that when the sticks 34 are returned to upright positions after making a turn in either direction, that the yieldable aileron holding unit 18 of the aileron which has been previously raised, will return said aileron to a position substantially coplanar to its wing and the abutment and stop means 32, 33 will prevent the aileron from being swung downwardly below such a position, as illustrated in Figures 3 and 4. Ordinarily, the leveling off maneuvers of the airplane for flight in its new course after completing a turn is accomplished by swinging the sticks 34 in the opposite direction to partially raise the other aileron, as for example, after completing a right turn, by swinging the sticks 34 to the left to slightly elevate the trailing end of the left aileron 14 to return the wings to positions in the same horizontal plane.

Figures 7 and 8 illustrate a tandem type of central controlling unit wherein the control sticks 34a are mounted one behind the other. The journal posts 36a are likewise disposed one behind the other. A member 49 which may me of hollow or tubular form has trunnions 50 extending from the ends thereof and which are journalled in the posts 36a, so that the sticks 34a will swing in unison transversely of the cockpit 12a when the number 49 is turned in either direction in its bearings 36a. The individual sticks 34a are pivotally connected at 35a, near their lower ends to the member 49 and extend through slots 51 of said member 49, so that the sticks 34a may be swung longitudinally of the cockpit 12a and relatively to the member 49. The lower ends of the sticks 34a are connected by a link 37a so that the sticks 34a are caused to swing in unison longitudinally of the cockpit. The inner ends of the two cables 38a and 45a may be connected to the lower end of either stick 34a, or one cable may be connected to each stick.

The same construction as illustrated in Figures 7 and 8 can form a single stick control by merely eliminating one of the sticks 34a and the link 37a and with both cables attached to the lower end of the single stick and extending transversely in the opposite directions therefrom.

In view of the detailed description of the use of the aileron control system with the sticks 34, a description of the use thereof with the sticks or stick 34a is considered unnecessary, as only the transverse movement of the stick or sticks 34a accomplishes the operation of the ailerons 14 and 15, as previously described, for executing turns.

Various other modifications and changes are contemplated and may obviously be resorted to, without departing from the spirit of scope of the invention as hereinafter defined by the appended claim.

I claim as my invention:

A single aileron control system for an airplane comprising right and left connecting members consisting of normally taut cables having inner adjacent ends connected to a central control means and having remote ends connected to the upstanding horns of right and left ailerons whereby movement of the central control means in one direction will exert a pull on one of said connecting members and the horn connected thereto to elevate the trailing end of the aileron to which said horn is secured and movement of the central control means in the opposite direction will exert a pull on said other connecting member to raise the trailing end of the other aileron, said cables having spaced portions angularly disposed relative to one another, pulleys around which said cables are trained between said angularly disposed cable portions, a yieldable aileron holding unit connecting each aileron to the wing thereof and returning the aileron to a position substantially coplanar to said wing when the pull on the connecting member of said aileron is released, whereby each aileron will be retained in a coplanar position to its wing except when the trailing end thereof is elevated by a pull exerted on the horn of said aileron by the connecting member connected thereto, and tensioning means associated with each of said cables and each consisting of a contractile spring for taking up the slack in one cable when said cable is slacked off by a pull exerted on the other cable by operation of said central control means.

References Cited in the file of this patent
UNITED STATES PATENTS

| Number | Name | Date |
|---|---|---|
| 1,964,418 | Alfaro | June 26, 1934 |
| 1,976,479 | Butler | Oct. 9, 1934 |
| 2,070,006 | Eaton, Jr., et al. | Feb. 9, 1937 |
| 2,412,647 | Northrop et al. | Dec. 17, 1946 |
| 2,479,619 | Hilton et al. | Aug. 23, 1949 |
| 2,549,044 | Ashkenas et al. | Apr. 17, 1951 |